(12) United States Patent
Shen

(10) Patent No.: US 9,971,933 B1
(45) Date of Patent: May 15, 2018

(54) FACIAL IMAGE SCREENING METHOD AND FACE RECOGNITION SYSTEM THEREOF

(71) Applicant: ULSee Inc., Taipei (TW)

(72) Inventor: Bau-Cheng Shen, Taipei (TW)

(73) Assignee: ULSee Inc., Taipei (TW)

( * ) Notice: Subject to any disclaimer, the term of this patent is extended or adjusted under 35 U.S.C. 154(b) by 0 days. days.

(21) Appl. No.: 15/401,180

(22) Filed: Jan. 9, 2017

(51) Int. Cl.
  *G06K 9/00* (2006.01)

(52) U.S. Cl.
  CPC ..... *G06K 9/00288* (2013.01); *G06K 9/00228* (2013.01); *G06K 9/00281* (2013.01); *G06K 9/00295* (2013.01)

(58) Field of Classification Search
  USPC ................................................. 382/115–118
  See application file for complete search history.

(56) References Cited

U.S. PATENT DOCUMENTS

| | | | |
|---|---|---|---|
| 5,982,912 A | 11/1999 | Fukui et al. | |
| 6,038,337 A | 3/2000 | Lawrence et al. | |
| 6,044,168 A | 3/2000 | Tuceryan et al. | |
| 6,292,575 B1 | 9/2001 | Bortolussi et al. | |
| 6,430,307 B1 | 8/2002 | Souma et al. | |
| 7,114,079 B1 | 9/2006 | Cook et al. | |
| 7,764,828 B2 | 7/2010 | Sasaki et al. | |
| 8,131,023 B2 | 3/2012 | Ishikawa | |
| 8,345,937 B2 | 1/2013 | Suzuki et al. | |
| 8,345,962 B2 | 1/2013 | Yu et al. | |
| 2005/0213805 A1* | 9/2005 | Blake ................. | G06K 9/036 382/137 |
| 2007/0201726 A1* | 8/2007 | Steinberg ........... | G06K 9/00221 382/103 |
| 2007/0258645 A1* | 11/2007 | Gokturk ............ | G06K 9/00288 382/190 |
| 2013/0073114 A1* | 3/2013 | Nemat-Nasser ...... | B60W 40/09 701/1 |

* cited by examiner

*Primary Examiner* — Alex Liew
(74) *Attorney, Agent, or Firm* — Alan D. Kamrath; Kamrath IP Lawfirm, P.A.

(57) ABSTRACT

A facial image screening method is provided in the present disclosure. The facial image screening method includes the following steps: tracking a plurality of feature points of at least one facial image; analyzing each feature point to acquire a region information corresponding to each feature point, wherein the region information comprises an image quality information, a face pose information, and a blocking degree information; scoring the image quality information to obtain a first arbitration score; scoring the face pose information to obtain a second arbitration score; scoring the blocking degree information to obtain a third arbitration score; generating a comprehensive quality score according to the first arbitration score, the second arbitration score, and the third arbitration; and taking the plurality of feature points of the facial image as targets to be compared with captured features of a plurality of specific persons when the comprehensive quality score exceeds a threshold value. The present disclosure has an advantage that a facial image suitable for face comparison may be selected so as to improve the recognition rate of one-to-one or one-to-many comparison.

16 Claims, 4 Drawing Sheets

Goal: select total S face images from N images by using estimated SCORE

Definition: fea_pool_1(v1, v2, v3), fea_pool_2( o=0.3, q=0.5 ), THRESH = 0.5

Objective: Want to find 3 face images which have v1, v2, and v3 pose and estimated occlusion score under 0.3, and image quality score under 0.5

```
for i=1:N
    for s=1:size(fea_pool_1)
        v = fea_pool_1(s)
        if SCORE(i, v)>THRESH
            put materials into Box
            Box[s] = 1
        end
    end
    if Box is full
        break;
    end
end
```

FIG. 4

FACIAL IMAGE SCREENING METHOD AND FACE RECOGNITION SYSTEM THEREOF

FIELD OF THE DISCLOSURE

The present disclosure relates to a facial image screening method and a face recognition system thereof, and more particularly to a facial image screening method and a face recognition system having a comprehensive quality score.

BACKGROUND OF THE INVENTION

The general workflow of a current face recognition system is divided into three parts. The first part is to select a facial image suitable for recognition from a video stream; the second part is to capture feature points of the facial image; and the third part is to perform a one-to-one or one-to-many comparison on the feature points of the facial image and the captured features of a plurality of specific persons in a database of the face recognition system. When the most similar facial features are obtained, a recognition result can be generated.

In addition, in the first part above, the facial image used for performing recognition is usually selected from a video. Most of current image-selecting methods use a face detection and analysis module (a face detector) to filter out a facial image with a specific face pose (such as, a front face image). This method uses the face pose information as a condition for screening the facial images. However, if the face region of the facial image is blocked by some shelters (such as, sunglasses or scarves) or has different facial expression changes, the shelters and facial expression changes will affect the final recognition result, which may reduce the recognition rate of the face recognition system.

Hence, how to select a facial image suitable for face comparison to improve the recognition rate of one-to-one or one-to-many comparison of a face recognition system has become an important topic for the person skilled in the art.

SUMMARY OF THE INVENTION

With this in mind, it is one objective of the present disclosure to provide a facial image screening method and a face recognition system. The facial image screening method and the face recognition system provided in the present disclosure is capable of selecting facial images suitable for face comparison so as to improve the recognition rate of one-to-one or one-to-many comparison of the face recognition system.

It is one objective of the present disclosure to provide afacial image screening method.

It is one objective of the present disclosure to provide a face recognition system.

According to one exemplary embodiment of the present disclosure, a facial image screening method is provided. The method includes the following steps: tracking a plurality of feature points of at least one facial image; analyzing each feature point to acquire a region information corresponding to each feature point, wherein the region information comprises an image quality information, a face pose information, and a blocking degree information; scoring the image quality information to obtain a first arbitration score; scoring the face pose information to obtain a second arbitration score; scoring the blocking degree information to obtain a third arbitration score; generating a comprehensive quality score according to the first arbitration score, the second arbitration score, and the third arbitration; and taking the plurality of feature points of the facial image as targets to be compared with captured features of a plurality of specific persons when the comprehensive quality score exceeds a threshold value.

In one embodiment, the image quality information indicates a position of the feature point tracked on the facial image.

In one embodiment, the face pose information indicates a face pose estimated in the facial image, and the face pose is defined by a range of three angles comprising a pitch angle, a roll angle, and a yaw angle.

In one embodiment, the blocking degree information indicates a blocking degree of a coverage region of the feature point tracked on the facial image.

In one embodiment, the first arbitration score is determined according to the following equation: score_a(i)=f (image$_f$, image$_b$); wherein image$_f$ indicates a facial image of an unknown persons, image$_b$ indicates an average of facial images of all specific persons in a database, f indicates an analysis of an image blur degree, and score_a(i) indicates the first arbitration score.

In one embodiment, the second arbitration score is determined according to the following equation: score_p(i)=(P$_i$−P$_T$)/E$_p$+(R$_i$−P$_R$)/E$_r$+(Y$_i$−P$_Y$)/E$_y$; wherein (P$_i$, R$_i$, Y$_i$) indicates a face pose estimated in an i-th facial image, P$_T$ indicates the pitch angle, P$_R$ indicates the roll angle, P$_Y$ indicates the yaw angle, E$_P$ indicates a tolerable error corresponding to the pitch angle, E$_r$ indicates a tolerable error corresponding to the roll angle, E$_y$ indicates a tolerable error corresponding to the yaw angle, and score_p(i) indicates the second arbitration score.

In one embodiment, the third arbitration score is determined according to the following equation:

$$\text{score\_c}(i) = (1/K) \sum_{k=1}^{K} Cik;$$

wherein Cik indicates a blocking degree of a coverage region of a k-th feature point tracked on an i-th frame, and score_c(i) indicates the third arbitration score.

In one embodiment, the comprehensive quality score is determined according to the following equation: Comprehensive quality score=wc*score_c(i)+wp*score_p(i)+wa*score_a(i); wherein we indicates a third weighting value corresponding to the third arbitration scorescore_c(i), wp indicates a second weighting value corresponding to the second arbitration score score_p(i), and wa indicates a first weighting value corresponding to the first arbitration score score_a(i).

According to another exemplary embodiment of the present disclosure, a face recognition system is provided. The face recognition system is applied to the abovementioned facial image screening method. The face recognition system includes a database, a face detection and analysis module, a score module, a quality estimation module, and a comparison module. The database is used for storing captured features of a plurality of specific persons. The face detection and analysis module is used for tracking a plurality of feature points of at least one facial image of an unknown person, and for analyzing each feature point to acquire a region information corresponding to each feature point, wherein the region information comprises an image quality information, a face pose information, and a blocking degree information. The score module is used for scoring the image quality information to obtain a first arbitration score, for scoring the face pose information to obtain a second arbitration score, and for scoring the blocking degree information to obtain a third arbitration score. The quality estimation module is used for generating a comprehensive quality score according to the first arbitration score, the second arbitration score, and the third arbitration. The comparison module is used for taking the plurality of feature points of the facial image as targets to be compared with captured features of a plurality of specific persons when the comprehensive quality score exceeds a threshold value.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram showing the source code of a screening method for screening a facial image 8 according to an example of the present disclosure.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Figure 1:
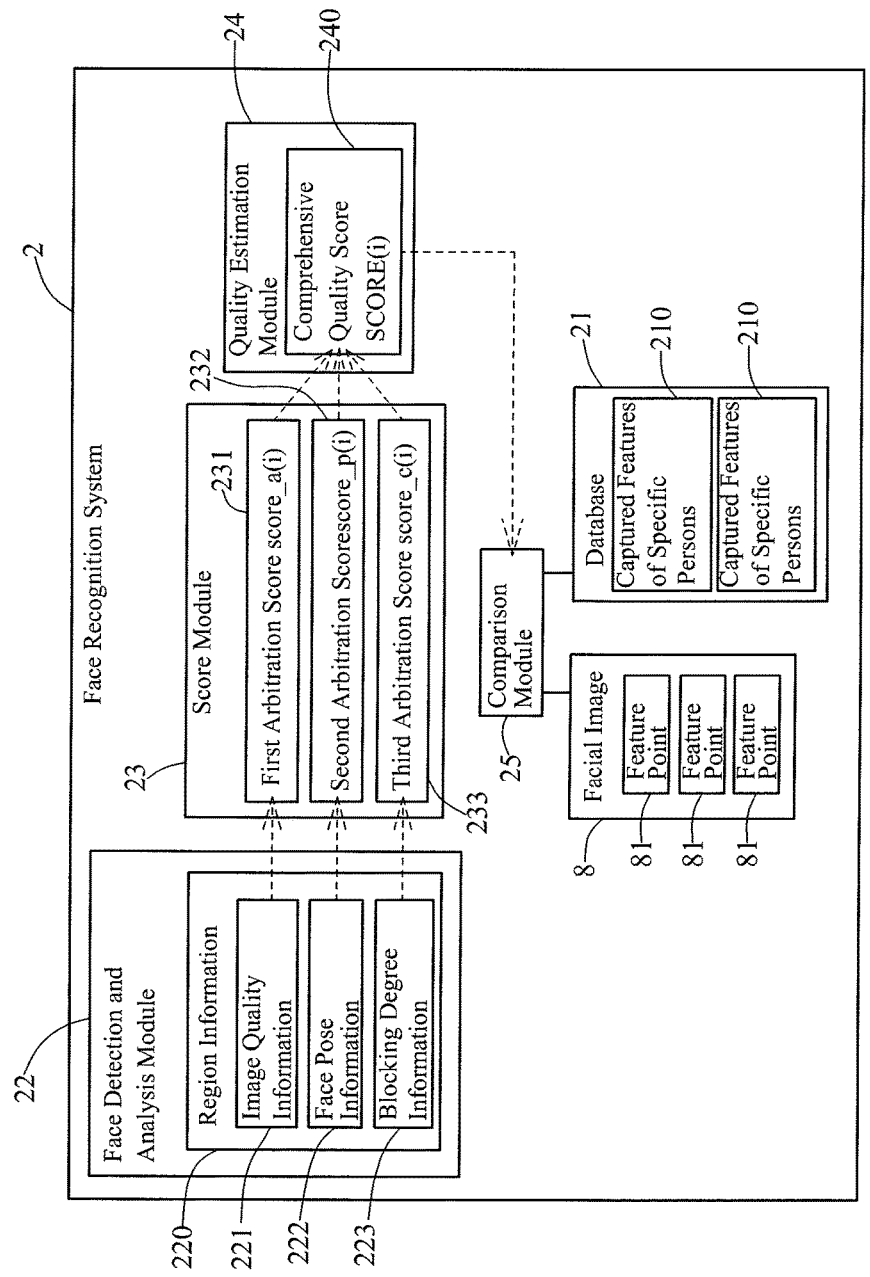
FIG. 1 is a block diagram of a face recognition system according to an embodiment of the present disclosure.

Please refer to FIG. 1. FIG. 1 is a block diagram of a face recognition system 2 according to an embodiment of the present disclosure. The face recognition system 2 includes a database 21, a face detection and analysis module 22, a score module 23, a quality estimation module 24, and a comparison module 25. The database 21 is used for storing captured features 210 of a plurality of specific persons, wherein all of the captured features 210 of the plurality of specific persons are the basis used by the comparison module 25 for comparing with other unknown persons. The face detection and analysis module 22 is used for tracking a plurality of feature points 81 of at least one facial image 8 of an unknown person. Please refer to FIG. 2, which is a diagram showing a plurality of feature points 81 of a facial image 8. Be noted that the facial image 8 belongs to one frame of a video stream, and the definition of the video stream has two types: the first type is a certain segment selected from a video file; and the second type is multiple images continuously captured by a digital camera. The face detection an analysis module 22 is further used for analyzing each feature point 81 to acquire a region information 220 corresponding to each feature point 81, wherein the region information 220 includes an image quality information 221, a face pose information 222, and a blocking degree information 223. In one embodiment, the image quality information 221 indicates a position of the feature point 81 tracked on the facial image 8. Therefore, an image blur degree of the facial image 8 may be known based on the image quality information 221. In one embodiment, the face pose information 222 indicates a face pose estimated in the facial image 8, and the face pose is defined by a range of three angles including a pitch angle, a roll angle, and a yaw angle. Therefore, anormalized result of the face pose may be known. In one embodiment, the blocking degree information 223 indicates a blocking degree of a coverage region of the feature point 81 tracked on the facial image 8. Therefore, a blocked condition of facial features of the face may be known.

The score module 23 is used for scoring the image quality information 221 to obtain a first arbitration score score_a(i) 231, for scoring the face pose information 222 to obtain a second arbitration score score_p(i) 232, and for scoring the blocking degree information 223 to obtain a third arbitration score score_c(i) 233, respectively.

In one embodiment, the first arbitration score score_a(i) 231 is determined according to the following equation: score_a(i)=f(image$_f$, image$_b$). Herein image$_f$ indicates a facial image of an unknown persons, image$_b$ indicates an average of facial images of all specific persons in the database 21, and f indicates an analysis of an image blur degree.

In one embodiment, the second arbitration score score_p (i) 232 is determined according to the following equation: score_p(i)=$(P_i-P_T)/E_p+(R_i-P_R)/E_r+(Y_i-P_Y)/E_y$. Herein ($P_i$, $R_i$, $Y_i$) indicates a face pose estimated in an i-th facial image, $P_T$ indicates the pitch angle, $P_R$ indicates the roll angle, $P_Y$ indicates the yaw angle, $E_P$ indicates a tolerable error corresponding to the pitch angle, $E_r$ indicates a tolerable error corresponding to the roll angle, and $E_y$ indicates a tolerable error corresponding to the yaw angle.

In one embodiment, the third arbitration score score_c(i) 233 is determined according to the following equation:

$$\text{score\_c}(i) = (1/K) \sum_{k=1}^{K} Cik.$$

Herein Cik indicates a blocking degree of a coverage region of a k-th feature point tracked on an i-th frame.

The quality estimation module 24 is used for generating a comprehensive quality score SCORE(i) 240 according to the first arbitration scorescore_a(i) 231, the second arbitration score score_p(i) 232, and the third arbitration score_c(i) 233. In one embodiment, the comprehensive quality score SCORE(i) 240 is determined according to the following equation: Comprehensive quality score=wc*score_c(i)+ wp*score_p(i)+wa*score_a(i). Herein we indicates a third weighting value corresponding to the third arbitration scorescore_c(i) 233, wp indicates a second weighting value corresponding to the second arbitration score score_p(i) 232, and wa indicates a first weighting value corresponding to the first arbitration score score_p(i) 231. The first weighting value wa, the second weighting value wp, and the third weighting value wc are able to control the importance of their corresponding arbitration scores score_a(i), score_p(i), and score_c(i). Finally, a comprehensive evaluation is performed to obtain the comprehensive quality score SCORE(i) 240.

A threshold value may be determined by the face recognition system 2 as a comparison threshold of the comprehensive quality score SCORE(i) 240. In detail, when the comprehensive quality score SCORE(i) 240 exceeds the threshold value, it represents that an image quality of the facial image 8 corresponding to the comprehensive quality scoreSCORE(i) 240 has reached a certain level and quality, wherein the image quality may include a continuity, a face pose, a blocked condition of facial features of the face, image blur degree, and/or anormalized result of the face pose. Therefore, when the comparison module 25 performs a comparison on the captured features 210 of a plurality of specific persons and the plurality of feature points 81 of the facial image 8, the recognition rate of comparison between them may be improved. On the other hand, when the comprehensive quality score SCORE(i) 240 is lower than the threshold value, it represents that the image quality of the facial image 8 corresponding to the comprehensive quality score SCORE(i) 240 is not good. For example, the face region is blocked, the facial expression changes too much, or the angle of the face pose is too large. At this time, the comparison module 25 is unable to compare the captured features 210 of the specific persons suitable for the facial image 8. In other words, only when the comprehensive quality score SCORE(i) 240 exceeds the threshold value, the comparison module 25 is able to perform a comparison on the facial image corresponding to the comprehensive quality score SCORE(i) 240.

Figure 3:
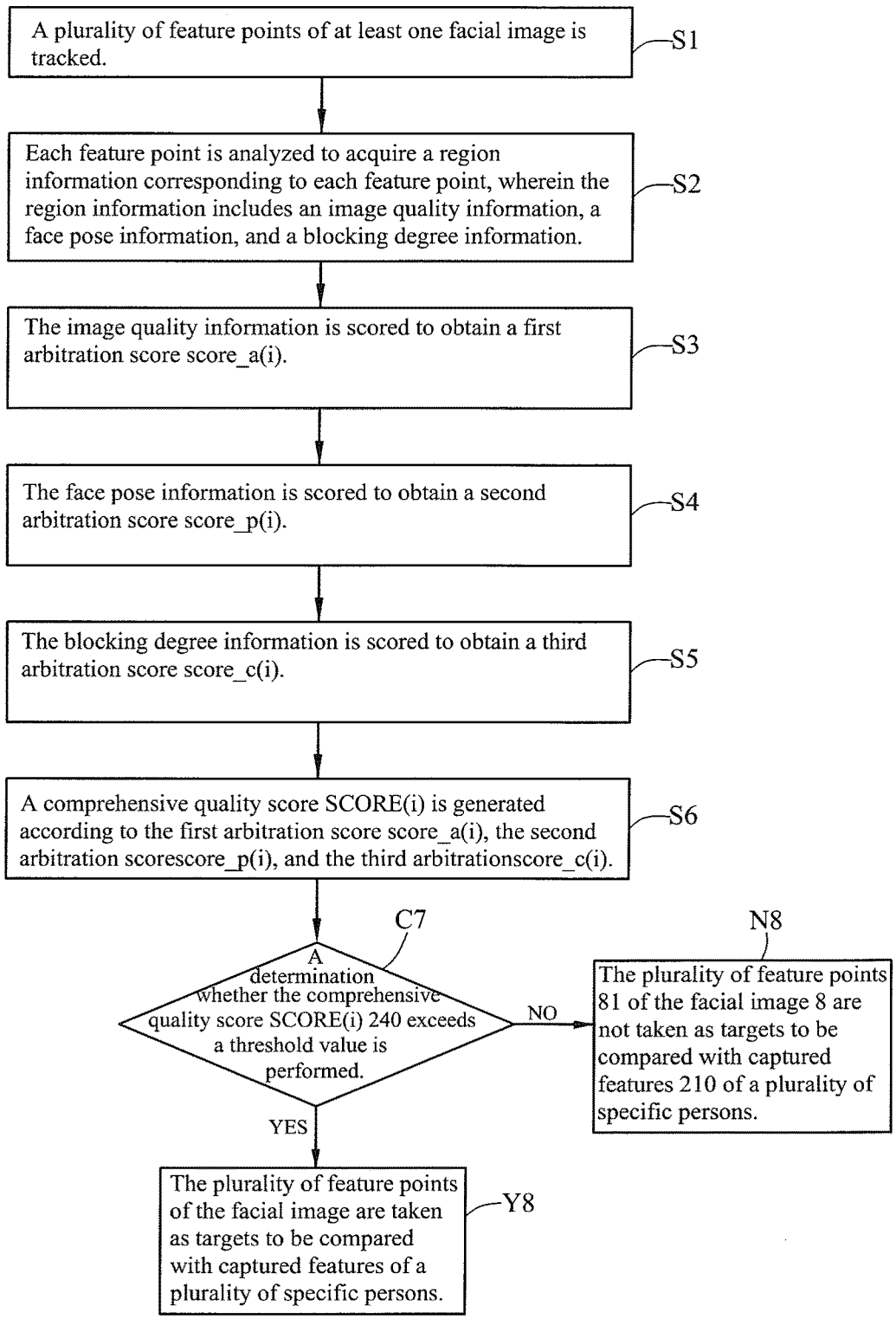
FIG. 3 is a flowchart illustrating the procedures of a screening method for screening a facial image 8 according to an example of the present disclosure.

Please refer to FIG. 3. FIG. 3 is a flowchart illustrating the procedures of a screening method for screening a facial image 8 according to an example of the present disclosure. Be noted that, the screening method for screening the facial image 8 is mainly applied to the abovementioned face recognition system 2. The screening method includes the following steps.

At the step S1, a plurality of feature points 81 of at least one facial image 8 is tracked. In detail, the face detection and analysis module 22 is used for tracking a plurality of feature points 81 of at least one facial image 8 of an unknown person.

At the step S2, each feature point 81 is analyzed to acquire a region information 220 corresponding to each feature point 81, wherein the region information 220 includes an image quality information 221, a face pose information 222, and a blocking degree information 223.

At the step S3, the image quality information 221 is scored to obtain a first arbitration score score_a(i) 231. In one embodiment, the first arbitration score score_a(i) 231 is determined according to the following equation: score_a(i)=f(image$_f$, image$_b$). Herein image$_f$ indicates a facial image of an unknown persons, and image$_b$ indicates an average of facial images of all specific persons in the database 21.

At the step S4, the face pose information 222 is scored to obtain a second arbitration score score_p(i) 232. In one embodiment, the second arbitration score score_p(i) 232 is determined according to the following equation: score_p(i)=$(P_i-P_T)/E_p+(R_i-P_R)/E_r+(Y_i-P_Y)/E_y$. Herein ($P_i$, $R_i$, $Y_i$) indicates a face pose estimated in an i-th facial image, $P_T$ indicates the pitch angle, $P_R$ indicates the roll angle, $P_Y$ indicates the yaw angle, $E_P$ indicates a tolerable error corresponding to the pitch angle, $E_r$ indicates a tolerable error corresponding to the roll angle, and $E_y$ indicates a tolerable error corresponding to the yaw angle.

At the step S5, the blocking degree information 223 is scored to obtain a third arbitration score score_c(i) 233. In one embodiment, the third arbitration score score_c(i) 233 is determined according to the following equation:

$$\text{score\_c}(i) = (1/K)\sum_{k=1}^{K} Cik.$$

Herein Cik indicates a blocking degree of a coverage region of a k-th feature point tracked on an i-th frame.

At the step S6, a comprehensive quality scoreSCORE(i) 240 is generated according to the first arbitration score score_a(i) 231, the second arbitration score score_p(i) 232, and the third arbitration score score_c(i) 233. In one embodiment, the comprehensive quality score SCORE(i) 240 is determined according to the following equation: Comprehensive quality score=wc*score_c(i)+wp*score_p(i)+wa*score_a(i). Herein wc indicates a third weighting value corresponding to the third arbitration score score_c(i) 233, wp indicates a second weighting value corresponding to the second arbitration score score_p(i) 232, and wa indicates a first weighting value corresponding to the first arbitration score score_a(i) 231.

At the step C7, a determination whether the comprehensive quality score SCORE(i) 240 exceeds a threshold value is performed. When the comprehensive quality score SCORE(i) 240 exceeds the threshold value, it represents that an image quality of the facial image 8 corresponding to the comprehensive quality score SCORE(i) 240 has reached a certain level and quality, wherein the image quality may include a continuity, a face pose, a blocked condition of facial features of the face, image blur degree, and/or anormalized result of the face pose. Under this condition, go to the step Y8. At the step Y8, the plurality of feature points 81 of the facial image 8 are taken as targets to be compared with captured features 210 of a plurality of specific persons. As a result, the whole recognition rate of the face recognition system 2 may be improved.

On the other hand, when the comprehensive quality score SCORE(i) 240 is lower than the threshold value, it represents that the image quality of the facial image 8 corresponding to the comprehensive quality score SCORE(i) 240 is not good, wherein the image quality may include a continuity, a face pose, a blocked condition of facial features of the face, image blur degree, and/or anormalized result of the face pose. Under this condition, go to the step N8. At the step N8, the plurality of feature points 81 of the facial image 8 are not taken as targets to be compared with captured features 210 of a plurality of specific persons. As a result, the occurrence of erroneous comparison results may be reduced.

Figure 2:
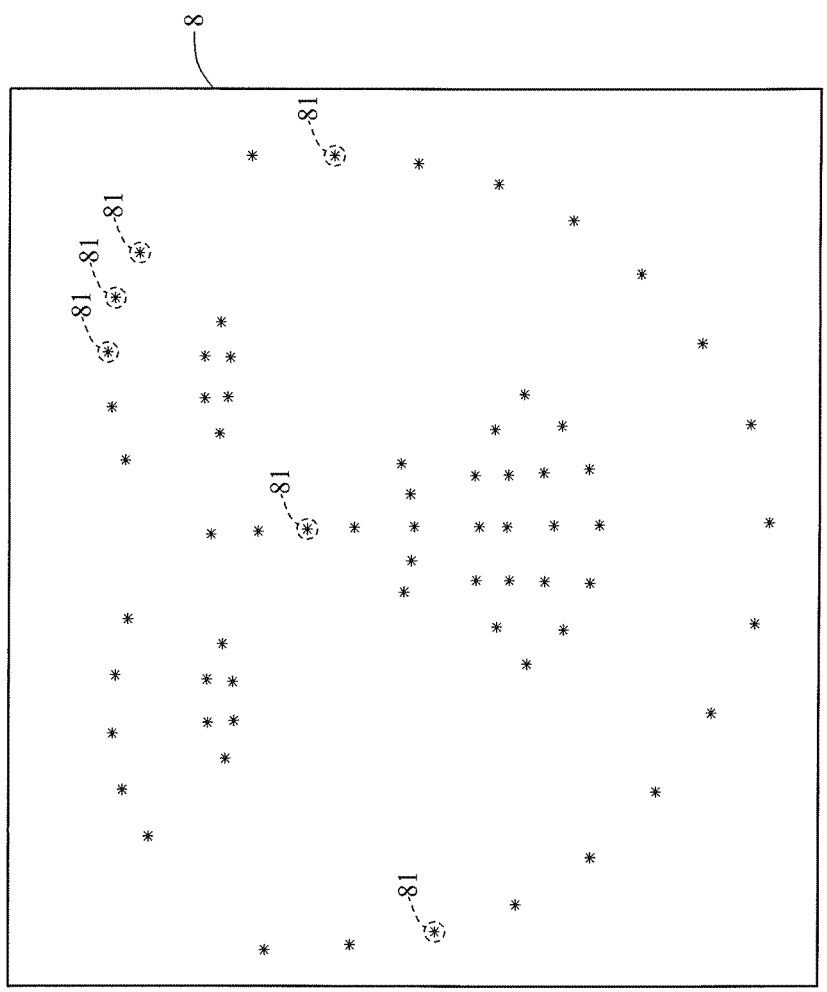
FIG. 2 is a diagram showing a plurality of feature points of a facial image.

The abovementioned facial image screening method in the embodiment of the present disclosure is further described in more detail as below. Assuming that an input is a video or a real-time video stream having a total of N consecutive facial frames/images, and assuming that at least one person is in the facial frames/images, the occurrence location and time of faces of specific persons can be known in advance by using face tracking technology. For example, if the face of a specific person is tracked in one facial image, the face feature point tracker can track this face until it disappears in this video. K feature points of each face can be tracked, as is shown in FIG. 2. Each tracked feature point can be used for analyzing related region information, which is defined as (Lik, Cik, Pi, Ri, Yi). Herein Lik indicates a position corresponding to a k-th feature point tracked on an i-th frame, Cik indicates a blocking degree of a coverage region of the k-th feature point tracked on the i-th frame, (Pi, Ri, Yi) indicates a face pose estimated on the i-th frame, which is defined by three angles (pitch, roll, yaw). The required conditions are listed in a feature pool, which defines a desired face angle "v" (pitch, roll, yaw), an acceptable blocking degree "o", and an acceptable image quality"q". For example, fea_pool(v1, v2, v3, o=0.3, q=0.5), wherein v1=(−10~10, −5~5, −5~5), v2=(−10~10, −5~5, 10), and v3=(−10~10, −5~5, 25). Three facial images with the face poses in accordance with v1, v2, v3, o, and q that can be found out in a video. That is to say, in each of the three facial images, the pitch angle is between negative 10 degrees and positive 10 degrees)(−10°~10°), the roll angle is between negative 5 degrees and positive 5 degrees)(−5°~5°), the yaw angle is between negative 5 degrees and positive 5 degrees) (−5°~5°)/negative 10 degrees and positive 10 degrees (−10°~10°)/25 degrees (25°), the blocking degree o is smaller than 0.3 (1.0 for the perfect score), and the image quality q is greater than 0.5.

Please refer to FIG. 4. FIG. 4 is a diagram showing the source code of a screening method for screening a facial image 8 according to an example of the present disclosure. The plurality of instructions of the source code shown in FIG. 4 correspond to the screening method for screening the facial image 8 in this embodiment. Be noted that, in FIG. 4, Box is defined as a container for storing selected facial images, wherein Box can be defined to have a specific size. When a number of the selected facial images achieves the specific size of Box, the selecting process is terminated. Therefore, by using the source code, facial images suitable for comparison can be selected.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A facial image screening method, comprising:
tracking a plurality of feature points of at least one facial image;
analyzing each feature point to acquire a region information corresponding to each feature point, wherein the region information comprises an image quality information, a face pose information, and a blocking degree information;
scoring the image quality information to obtain a first arbitration score;
scoring the face pose information to obtain a second arbitration score;
scoring the blocking degree information to obtain a third arbitration score;
generating a comprehensive quality score according to the first arbitration score, the second arbitration score, and the third arbitration; and
taking the plurality of feature points of the facial image as targets to be compared with captured features of a plurality of specific persons when the comprehensive quality score exceeds a threshold value.

2. The facial image screening method according to claim 1, wherein the image quality information indicates a position of the feature point tracked on the facial image.

3. The facial image screening method according to claim 1, wherein the face pose information indicates a face pose estimated in the facial image, and the face pose is defined by a range of three angles comprising a pitch angle, a roll angle, and a yaw angle.

4. The facial image screening method according to claim 1, wherein the blocking degree information indicates a blocking degree of a coverage region of the feature point tracked on the facial image.

5. The facial image screening method according to claim 1, wherein the first arbitration score is determined according to the following equation:

$$\text{score\_}a(i)=f(\text{image}_f,\text{image}_b);$$

wherein $\text{image}_f$ indicates a facial image of an unknown persons, $\text{image}_b$ indicates an average of facial images of all specific persons in a database, f indicates an analysis of an image blur degree, and score_a(i) indicates the first arbitration score.

6. The facial image screening method according to claim 5, wherein the second arbitration score is determined according to the following equation:

$$\text{score\_}p(i)=(P_i-P_T)/E_P+(R_i-P_R)/E_r+(Y_i-P_Y)/E_y;$$

wherein $(P_i, R_i, Y_i)$ indicates a face pose estimated in an i-th facial image, $P_T$ indicates the pitch angle, $P_R$ indicates the roll angle, $P_Y$ indicates the yaw angle, $E_P$ indicates a tolerable error corresponding to the pitch angle, $E_r$ indicates a tolerable error corresponding to the roll angle, $E_y$ indicates a tolerable error corresponding to the yaw angle, and score_p(i) indicates the second arbitration score.

7. The facial image screening method according to claim 6, wherein the third arbitration score is determined according to the following equation:

$$\text{score\_}c(i) = (1/K)\sum_{k=1}^{K} Cik;$$

wherein Cik indicates a blocking degree of a coverage region of a k-th feature point tracked on an i-th frame, and score_c(i) indicates the third arbitration score.

8. The facial image screening method according to claim 7, wherein the comprehensive quality score is determined according to the following equation:

$$\text{Comprehensive quality score} = wc^* \text{score\_}c(i) + wp^* \text{score\_}p(i) + wa^* \text{score\_}a(i);$$

wherein wc indicates a third weighting value corresponding to the third arbitration score score_c(i), wp indicates a second weighting value corresponding to the second arbitration score score_p(i), and wa indicates a first weighting value corresponding to the first arbitration score score_a(i).

9. A face recognition system, the face recognition system comprising:
- a database, used for storing captured features of a plurality of specific persons;
- a face detection and analysis module, used for tracking a plurality of feature points of at least one facial image of an unknown person, and for analyzing each feature point to acquire a region information corresponding to each feature point, wherein the region information comprises an image quality information, a face pose information, and a blocking degree information;
- a score module, used for scoring the image quality information to obtain a first arbitration score, for scoring the face pose information to obtain a second arbitration score, and for scoring the blocking degree information to obtain a third arbitration score;
- a quality estimation module, used for generating a comprehensive quality score according to the first arbitration score, the second arbitration score, and the third arbitration; and
- a comparison module, used for taking the plurality of feature points of the facial image as targets to be compared with captured features of a plurality of specific persons when the comprehensive quality score exceeds a threshold value.

10. The face recognition system according to claim 9, wherein the image quality information indicates a position of the feature point tracked on the facial image.

11. The face recognition system according to claim 9, wherein the face pose information indicates a face pose estimated in the facial image, and the face pose is defined by a range of three angles comprising a pitch angle, a roll angle, and a yaw angle.

12. The face recognition system according to claim 9, wherein the blocking degree information indicates a blocking degree of a coverage region of the feature point tracked on the facial image.

13. The face recognition system according to claim 9, wherein the first arbitration score is determined according to the following equation:

$$\text{score\_}a(i) = f(\text{image}_f, \text{image}_b);$$

wherein $\text{image}_f$ indicates a facial image of an unknown persons, $\text{image}_b$ indicates an average of facial images of all specific persons in a database, f indicates an analysis of an image blur degree, and score_a(i) indicates the first arbitration score.

14. The face recognition system according to claim 13, wherein the second arbitration score is determined according to the following equation:

$$\text{score\_}p(i) = (P_i - P_T)/E_P + (R_i - P_R)/E_r + (Y_i - P_Y)/E_y;$$

wherein $(P_i, R_i, Y_i)$ indicates a face pose estimated in an i-th facial image, $P_T$ indicates the pitch angle, $P_R$ indicates the roll angle, $P_Y$ indicates the yaw angle, $E_P$ indicates a tolerable error corresponding to the pitch angle, $E_r$ indicates a tolerable error corresponding to the roll angle, $E_y$ indicates a tolerable error corresponding to the yaw angle, and score_p(i) indicates the second arbitration score.

15. The face recognition system according to claim 14, wherein the third arbitration score is determined according to the following equation:

$$\text{score\_}c(i) = (1/K) \sum_{k=1}^{K} Cik;$$

wherein Cik indicates a blocking degree of a coverage region of a k-th feature point tracked on an i-th frame, and score_c(i) indicates the third arbitration score.

16. The face recognition system according to claim 15, wherein the comprehensive quality score is determined according to the following equation:

$$\text{Comprehensive quality score} = wc^* \text{score\_}c(i) + wp^* \text{score\_}p(i) + wa^* \text{score\_}a(i);$$

wherein wc indicates a third weighting value corresponding to the third arbitration scorescore_c(i), wp indicates a second weighting value corresponding to the second arbitration score score_p(i), and wa indicates a first weighting value corresponding to the first arbitration score score_a(i).

* * * * *